(12) United States Patent
Liu et al.

(10) Patent No.: US 12,085,483 B2
(45) Date of Patent: Sep. 10, 2024

(54) METHOD AND SYSTEM OF LEAK DETECTING FOR OIL AND GAS PIPELINE BASED ON EXCITATION RESPONSE

(71) Applicants: CHINA UNIVERSITY OF PETROLEUM (EAST CHINA), Shandong (CN); PIPECHINA SOUTH CHINA COMPANY, Guangdong (CN); GUANGDONG SOUTH CHINA INTELLIGENT PIPELINE RESEARCH INSTITUTE, Guangdong (CN)

(72) Inventors: Cuiwei Liu, Qingdao (CN); Zhongshan Tian, Guangzhou (CN); Yuxing Li, Qingdao (CN); Shaochuan Lai, Guangzhou (CN); Wen Yang, Guangzhou (CN); Gang Liu, Qingdao (CN); Wubin Lin, Guangzhou (CN); Chen Zhang, Guangzhou (CN)

(73) Assignees: CHINA UNIVERSITY OF PETROLEUM (EAST CHINA), Qingdao (CN); PIPECHINA SOUTH CHINA COMPANY, Qingdao (CN); GUANGDONG SOUTH CHINA INTELLIGENT PIPELINE RESEARCH INSTITUTE, Guangzhou (CN)

( * ) Notice: Subject to any disclaimer, the term of this patent is extended or adjusted under 35 U.S.C. 154(b) by 372 days.

(21) Appl. No.: 17/774,031

(22) PCT Filed: Sep. 24, 2020

(86) PCT No.: PCT/CN2020/117510
§ 371 (c)(1),
(2) Date: May 3, 2022

(87) PCT Pub. No.: WO2021/088557
PCT Pub. Date: May 14, 2021

(65) Prior Publication Data
US 2022/0397477 A1    Dec. 15, 2022

(30) Foreign Application Priority Data
Nov. 5, 2019   (CN) .......................... 201911071495.6

(51) Int. Cl.
*G01M 3/16* (2006.01)
*F17D 5/06* (2006.01)
*G01M 3/24* (2006.01)

(52) U.S. Cl.
CPC ............... *G01M 3/243* (2013.01); *F17D 5/06* (2013.01)

(58) Field of Classification Search
CPC ................................. G01M 3/243; F17D 5/06
See application file for complete search history.

(56) References Cited

U.S. PATENT DOCUMENTS

| 6,389,881 B1 | 5/2002 | Yang et al. | |
| 2014/0290343 A1* | 10/2014 | Kulkarni | G01M 3/002 73/40.5 R |

(Continued)

FOREIGN PATENT DOCUMENTS

| CN | 104930355 A | 9/2015 |
| CN | 105351756 A | 2/2016 |

(Continued)

OTHER PUBLICATIONS

Dec. 3, 2020 International Search Report issued in International Patent Application No. PCT/CN2020/117510.
Dec. 3, 2020 Written Opinion issued in International Patent Application No. PCT/CN2020/117510.

*Primary Examiner* — Eric S. McCall
(74) *Attorney, Agent, or Firm* — Oliff PLC (57) ABSTRACT

A method of leak detection for oil and gas pipeline based on excitation response and system thereof includes: applying an (Continued)

active excitation signal (a pressure pulse directly input by human) or a passive excitation signal (a pressure fluctuation caused by opening and closing valves, etc.) to an oil and gas pipeline with existing leakage points, the excitation signal is reflected at the pipeline boundary and the leakage, and the reflected pressure wave continues to propagate to upstream and downstream, and finally is collected by the dynamic pressure transducer, then the existing leakage of the pipeline is detected and positioned by analyzing the transient response signal and the reflected pressure wave of leakage signal.

11 Claims, 2 Drawing Sheets

(56) References Cited

U.S. PATENT DOCUMENTS

| | | | |
|---|---|---|---|
| 2016/0033354 A1* | 2/2016 | Li | F17D 5/06 |
| | | | 73/40.5 A |
| 2024/0085263 A1* | 3/2024 | Nash | G01M 3/40 |

FOREIGN PATENT DOCUMENTS

| | | |
|---|---|---|
| CN | 107218516 A | 9/2017 |
| CN | 108506732 A | 9/2018 |
| CN | 110081319 A | 8/2019 |
| CN | 110762398 A | 2/2020 |
| FR | 2619890 B1 | 3/1990 |

* cited by examiner

METHOD AND SYSTEM OF LEAK DETECTING FOR OIL AND GAS PIPELINE BASED ON EXCITATION RESPONSE

CROSS-REFERENCES TO RELATED APPLICATIONS

This application claims priority benefits to Chinese Patent Application No. 2019110714956, filed on 5 Nov. 2019, the contents of which are incorporated herein by reference.

TECHNICAL FIELD

The present invention relates to the technical field of leak detection for oil and gas pipeline, and specifically relates to a method and system of leak detection for oil and gas pipeline based on excitation response.

BACKGROUND TECHNOLOGY

Information of the related art part is merely disclosed to increase the understanding of the overall background of the present invention, but is not necessarily regarded as acknowledging or suggesting, in any form, that the information constitutes the prior art known to a person of ordinary skill in the art.

Pipeline transportation has a wide application in the transportation of petroleum and products thereof due to its unique advantages such as convenience and efficiency in transporting liquids and fluids. As the scale of transportation pipelines increases, some inevitable problems are bound to arise, such as natural aging, corrosion and abrasion of pipelines, damaged by third parties and various geological factors, which cause safety problems such as leakage or even fracture of pipelines. As most of the oil pipelines are buried, when the oil pipeline leaks, a seepage migration of the leaked oil in the soil is difficult to be observed, but the impacts such as: environmental pollution, economic losses and the potential risk of fire and explosion are not negligible. Therefore, it is of great significance to study the leak detection technology of oil pipelines to ensure safe and efficient operation of pipelines.

According to the inventor, presently, there are a variety of leak detection and location techniques for pipeline, such as the negative pressure wave method, the acoustic method, the transient method, etc. However, these existing methods have certain limitations in terms of applicable leak conditions and applications, for example, the accuracy of leak detection can be seriously affected by pipeline welds and unsmooth pipelines; small leakages, slow leakages, and existing leakages are difficult to be detected by using the negative pressure wave method, the acoustic method, etc., which are only applicable to sudden leakage; it is required to model each kind of pipeline and leakage separately by using the transient model method, which is a more complex process and has a poor universality.

SUMMARY

To solve the above problems, the present disclosure provides a method and system of leak detection for oil and gas pipeline based on excitation response. Accordingly, by actively applying an excitation signal and analyzing the leakage information of the pipeline according to the change of dynamic pressure wave, the present disclosure, in laboratory conditions and field pipeline operation, can complete the effective detection and accurate positioning of the leakage holes that cannot be detected by the negative pressure wave method or the acoustic method such as gradually larger leakage holes and existing leakage holes and so on, so as to provide a strong guarantee for the safe operation of oil and gas pipelines.

According to some embodiments, the present disclosure adopts the following technical solution:

A system of leak detection for oil and gas pipeline based on an excitation response, comprising:
an excitation signal module, being configured to generate an excitation signal to be transmitted to an oil and gas pipeline to be detected;
a detection module, comprising a plurality of dynamic pressure transducers arranged along the oil and gas pipeline, for detecting, during a propagation of a pressure wave generated by the excitation signal, a reflected signal formed by that a transient signal of the pressure wave is deflected when reaching a pipeline boundary and/or a leakage point;
a transient pressure response module, being configured to compare variations of transient pressure responses with time under two working conditions of when there is no leakage in the pipeline and there is leakage in the pipeline, to find out differences of the transient pressure responses under the two working conditions, and to determine whether there is a leak;
a signal processing module, being configured to de-noise a collected dynamic pressure signal, extract effective features, identify signal singularities, and carry out a judgment combined with frequency domain features to identify the reflected pressure wave signal, and analyze an arrival time of the reflected pressure wave signal and amplitude and frequency characteristics of the pressure wave, determine the leakage of the pipeline according to performance of the pressure wave in the time domain combined with a distribution in the frequency domain, and carry out an accurate positioning of the leakage point according to the arrival time of the reflected pressure wave signal at the dynamic pressure transducers and a propagation speed of the pressure wave in the pipeline.

As a further limitation, the excitation signal comprises an active excitation signal and a passive excitation signal.

The active excitation signal is a pressure pulse directly input from outside, and the passive excitation signal is a pressure fluctuation generated by opening and closing valves and other components.

As a further limitation, an upstream and a downstream of the oil and gas pipeline are provided with one storage tank respectively.

As a further limitation, the detection module comprises at least one dynamic pressure transducer provided at the upstream of the oil and gas pipeline, the dynamic pressure transducer being connected to an A/D capture card, and the A/D capture card being connected to a processor.

A method of leak detection for oil and gas pipeline based on excitation response, comprising:
generating an excitation signal to be transmitted to an oil and gas pipeline to be detected;
by using a dynamic pressure transducer, detecting in real time, during a propagation of a pressure wave generated by the excitation signal, a reflected signal formed by that a transient signal of the pressure wave is deflected when reaching a pipeline boundary and/or a leakage point;
de-noising a collected dynamic pressure signal and extracting effective features to identify signal singularities, and carrying out a judgment combined with frequency domain features to identify a reflected pressure wave signal;

comparing variations of transient pressure responses with time when there is no leakage in the pipeline and there is leakage in the pipeline, finding out differences of the transient pressure responses under the two working conditions, and judging whether there is a leak or not;

analyzing an arrival time of the reflected pressure wave signal and amplitude and frequency characteristics of the pressure wave, judging the leakage of the pipeline according to performance of the pressure wave in a time domain combined with a distribution in a frequency domain, and carrying out an accurate positioning of the leakage point according to the arrival time of the reflected pressure wave at the dynamic pressure transducers and a propagation speed of the pressure wave in the pipeline.

As a further limitation, the collected dynamic pressure signal is de-noised by wavelet transform.

As a further limitation, the reflected pressure wave signal is transformed into the frequency domain using the short-time Fourier transform, because the frequency characteristics of the signal are the inherent characteristics of the signal itself, the frequency signal at the leakage hole is significantly different from the frequency signal inside the pipeline, and the analysis of the frequency band of the leak signal assists in identifying the leak information.

As a further limitation, the variation of transient pressure response with time with the excitation signal applied under an operating condition without unknown leak hole is: boundaries of an upstream and a downstream of the pipeline system are storage tanks, so when the excitation signal is applied at a position I, a decompression wave signal generated by the leakage at the position I will propagate to both the upstream and downstream sides with a speed a, and characteristics of the decompression wave signal are as follows:

a pressure wave signal propagating to the upstream $\bar{p}$: the $\bar{p}$ propagates to the upstream and reaches the dynamic pressure transducer at a position M at a moment $t_0$, the dynamic pressure transducer detects the signal, which is represented as a water head drops by $\Delta H_1$; the $\bar{p}$ continues to propagate to the upstream until reaching the upstream boundary, because a material loss caused by the leakage is replenished at the boundary, the pressure density returns to the state before the leak occurred; similarly, the replenishment will also propagate to the downstream because of the continuity of the fluid, i.e. being represented as a boost wave with a magnitude of $\Delta H_1$, the signal is collected by the dynamic pressure transducer M at a moment $t_2$, which is represented as the water head rises by $\Delta H_1$;

a pressure wave signal propagating to the downstream $\vec{P}$: while the $\bar{p}$ propagating to the upstream, the $\vec{P}$ also is propagating to the downstream until it reaches the downstream boundary, with the completion of the same change of the $\bar{p}$, the material loss is replenished, generating a boost wave propagating to the upstream, which is collected by the dynamic pressure transducer M, and represented as the water head rises by $\Delta H_1$.

As a further limitation, the variation of transient pressure response with time with the applied excitation signal applied under the working condition with an unknown leak hole is: the boundaries of the upstream and downstream of the pipeline system are the storage tanks, there is a leakage point to be detected at a position B, so when the excitation signal is applied at the position I, the variation of the transient pressure response with time is received by the dynamic pressure transducer at the position M, the decompression wave signal generated by the leakage at the position I propagates to both the upstream and the downstream with the speed a, and characteristics of the pressure wave signal during the process are as follows:

the pressure wave signal propagating to the upstream $\bar{p}$: the $\bar{p}$ continues to propagate to the upstream until the upstream boundary, because the material loss caused by the leakage is replenished at the boundary, the pressure density returns to the state before the leak occurred; similarly, the replenishment will also propagate to the downstream because of the continuity of the fluid, i.e. being represented as a boost wave with a magnitude of $\Delta H_1$;

the pressure wave signal propagating to the downstream $\vec{P}$: while the $\bar{p}$ propagating to the upstream, the $\vec{P}$ also is propagating to the downstream, and when the $\vec{P}$ propagating to the position B of the unknown leak hole, an existence of the decompression wave reduces the pressure difference between internal and external pressures of the pipeline at the unknown leakage hole to be detected at position B, and decreases an amount of material leakage, and on a basis of the original stability, which is equivalent to the material replenishment is obtained at the position, which in turn leads to an increase in both density and pressure at the position, and generating a boost wave signal $P_B$; then, the $\vec{P}$ continues to propagate to the downstream and reaches the downstream boundary, and completes the same change as $\bar{p}$, the material loss is replenished, resulting in a boost wave propagating to the upstream, which is represented as the water head rises by $(\Delta H_1 - \Delta H_2)$.

As a further limitation, when the $\vec{P}$ reaching the leakage point B, a new pressure wave signal propagating to both the upstream and downstream sides will be generated, the new pressure wave signal propagating to the downstream $\vec{P_B}$ will be superimposed with the original signal $\vec{P}$, and a final result will be a decrease in the value of the signal $\vec{P}$, the superimposed signal propagates to the downstream boundary, where the material is replenished and a boost wave propagates back to the upstream, which is detected by the dynamic pressure transducer at the position M, being represented as the water head rises by $(\Delta H_1 - \Delta H_2)$.

As a further limitation, the new pressure wave signal propagating to the upstream $\overline{P_B}$ propagates to the position M, which is detected by the dynamic pressure transducer, and represented as the water head rises by $\Delta H_2$, and the signal continues to propagates to the upstream until reaching the upstream boundary, the boost wave due to "material replenishment" will disappear due to the loss of excess material, i.e. the boost wave disappears. Since a pressure rise has been generated on a trajectory of the boost wave, due to the continuity of the fluid, the phenomenon that the boost wave disappears will propagate to the downstream, which is represented as the decompression wave and is detected by the dynamic pressure transducer at the position M, which is represented as the water head drops by $\Delta H_2$.

Compared with the prior art, the beneficial effect of the present disclosure is:

The present disclosure can complete the detection and accurate positioning of the leakage point that has leaked in the oil and gas pipeline. The present disclosure can not only effectively detect sudden leaks in oil and gas pipelines, but also detect and locate slow leaks and pre-existing leaks in the oil and gas pipeline operation, and the present method has the advantages of high sensitivity, high accuracy in locating, strong adaptability, easy calculation, and the ability to detect small leaks, slow leaks and pre-existing leaks. The present disclosure is of great significance and practical application value for the study of leak detection and localization of the oil and gas pipelines.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Wherein: M—Dynamic pressure transducer; I—Actively applied transient leakage point (excitation signal); L—Total length of pipeline; B—Unknown leakage point to be detected; H—Value of water head of fluid in the pipeline; t—Time.

DETAILED DESCRIPTION

The present disclosure will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

In the present disclosure, the position or positional relationship indicated by terms such as "up", "down", "left", "right", "front", "back", "vertical", "horizontal", "side", "bottom" is based on the position or positional relationship shown in the attached drawings, which is only a relational word determined for the convenience of describing the structural relationship of each component or element of the present disclosure, and does not specifically refer to any component or element in the present disclosure, and therefore cannot be construed as a limitation of the present disclosure.

In the present disclosure, the terms such as "fixed", "connect with", "connect to" and other terms shall be understood in a broad sense. For example, it can be a fixed connection, an integrated connection or a removable connection; it can be a direct connection or an indirect connection through an intermediate medium, an internal connection of two components, or an interactive relationship between two components. For those skilled in the art, the specific meaning of the above terms in the invention can be understood according to the specific situation.

A system of leak detection for oil and gas pipeline based on excitation response, comprising: an excitation signal module (generating excitation signals), a system of liquid pipeline (the system to be tested), a detection system (detecting a pressure signal), a transient pressure response module (the transient pressure causes a pressure fluctuation in the pipeline), and a signal processing module (processing and analyzing pressure signals), wherein:

the excitation signal module applies an active excitation signal (a pressure pulse directly input by human) or a passive excitation signal (a pressure fluctuation caused by opening and closing valves) to an oil and gas pipeline with existing leakage points. A pressure wave generated by the excitation signal propagates in the pipe, and when the propagated transient signal reaches pipeline boundaries and leakage points, part of the energy of main wave of the pressure wave is diverted to form a new reflected signal (causing a negative pressure wave), and the reflected signal propagates to upstream and downstream respectively, which is collected by dynamic pressure transducers arranged along the pipeline. The detection of the reflected signal and the measurement of arrival time thereof to the dynamic pressure transducer can be utilized to detect the leakage.

Figure 1:
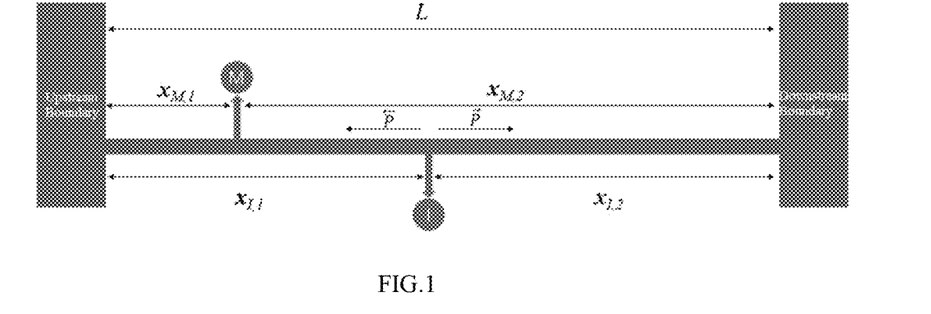
FIG. 1 is a structural diagram of actively applying transient leakage when there is no unknown leakage hole in the present disclosure.

The system of oil and gas pipeline, comprising: pipeline systems with excitation signals applied when there is no leakage and when there are leakage holes:

(1) As shown in FIG. 1, the pipeline system with the excitation signal applied when there is no leakage hole comprises the following facilities: a section of the oil and gas pipeline with a total length of L, two oil storage tanks are provided at an upstream and a downstream of the pipeline, a dynamic pressure transducer (M) is provided at a distance $x_{M,I}$ from the storage tank at upstream; applying one the active excitation signal (the pressure pulse directly input by human) or one the passive excitation signal (the pressure fluctuation caused by opening and closing valves) (I) at a distance $x_{I,1}$ from the storage tank at upstream, and the transient pressure generated by the excitation signal at position I propagates to the upstream and downstream of the pipeline respectively, and the dynamic pressure transducer at the position M receives the dynamic pressure change.

Figure 2:
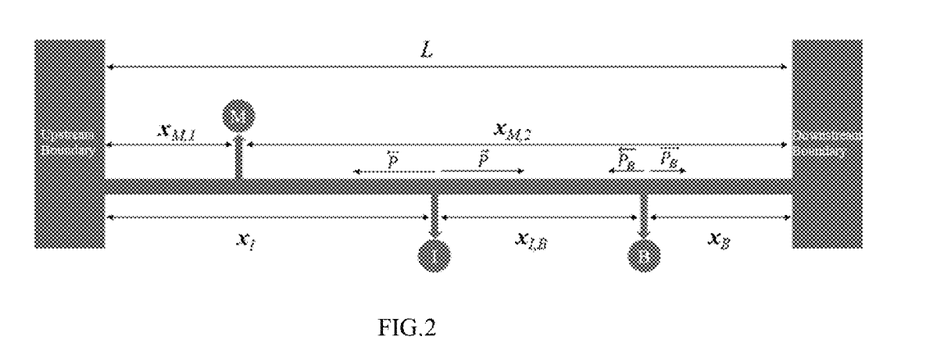
FIG. 2 is a structural diagram of actively applying transient leakage when there is an unknown leakage hole in the present disclosure.

(2) As shown in FIG. 2, the pipeline system with the excitation signal applied when there is an unknown leakage hole comprises the following facilities: the section of the oil and gas pipeline with the total length of L, the two oil storage tanks provided at the upstream and downstream of the pipeline, the dynamic pressure transducer (M) being provided at the distance $x_{M,I}$ from the storage tank at upstream, and an unknown leakage point (B) to be detected is set at a distance $X_B$ from the storage tank at downstream; applying the active excitation signal (the pressure pulse directly input by human) or the passive excitation signal (the pressure fluctuation caused by opening and closing valves, etc.) (I) at a distance $x_I$ from the storage tank at upstream, and the transient pressure generated by the excitation signal at the position I propagates to the upstream and downstream of the pipeline respectively; when the transient pressure propagates to the leakage point B and the storage tanks at upstream and downstream, reflected signals will be generated, and the reflected signals will continue to propagate to the upstream and downstream, and be received and collected by the dynamic pressure transducer at the position M.

The detection system, for collecting the dynamic pressure signal at the end of the pipeline and comprising: the dynamic pressure transducer, an A/D capture card, a computer and data acquisition software.

Figure 3:
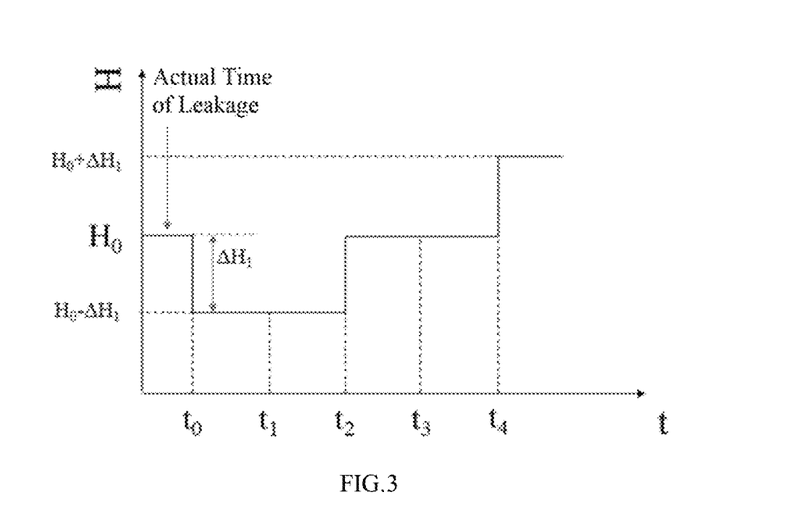
FIG. 3 is a schematic diagram of a variation of a water head (pressure) of the transient leakage with time when there is no unknown leakage hole in the present disclosure.

The transient pressure response module comprises transient pressure responses under the condition that the excitation signal is applied when there is no leakage and when there is a leakage hole:

(1) As shown in FIG. 3, an variation of the transient pressure response with time with excitation signal applied without leakage: the upstream and downstream boundaries of the pipeline system are the oil storage tanks, so when the excitation signal (leakage) is applied at the position I, the variation of the dynamic pressure with time received by the dynamic pressure transducer at the position M (without considering the energy loss) is shown in FIG. 3. A signal of decompression wave is generated by the leakage at the position I, and propagates to both the upstream and the downstream at a speed a. The following is an analysis of the decompression wave signal in the propagation process:

the decompression wave signal propagating to the upstream $\overleftarrow{p}$: the $\overleftarrow{p}$ propagates to the upstream and reaches the position M at a moment $t_0$, the dynamic pressure transducer detects the signal, and which is represented as a water head drops by $\Delta H_1$; the $\overleftarrow{p}$ continues to propagate to the upstream until the upstream boundary, because a material loss caused by the leakage is replenished at the boundary, a pressure density returns to a state before the leak occurred; similarly, the 'replenishment' will also propagate to the downstream because of the continuity of the fluid, i.e. being represented as a boost wave with a magnitude of $\Delta H_1$, the signal is collected by the dynamic pressure transducer M at a moment $t_2$, which is represented as the water head rises by $\Delta H_1$;

a pressure wave signal propagating to the downstream $\overrightarrow{P}$:

while the $\overleftarrow{p}$ propagating to the upstream, the $\overrightarrow{P}$ also is propagating to the downstream until it reaches the downstream boundary, with the completion of the same change of the $\overleftarrow{p}$, the material loss is replenished, generating a boost wave propagating to the upstream, which is collected by the dynamic pressure transducer M at a moment $t_4$, and represented as the water head rises by $\Delta H_1$.

Figure 4:
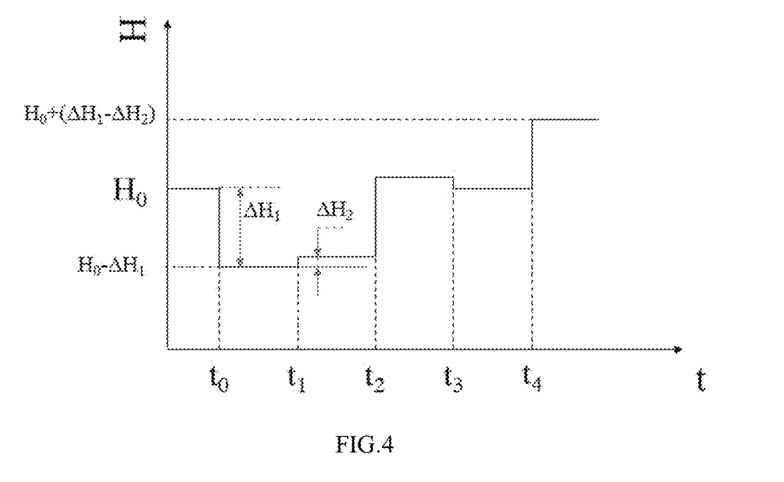
FIG. 4 is a schematic diagram of a variation of the water head (pressure) of the transient leakage with time when there is an unknown leakage hole in the present disclosure.

(2) The variation of transient pressure response with time with the applied excitation signal applied with unknown leak hole: the upstream and downstream boundaries of the pipeline system are the storage tanks, there is a leakage point to be detected at a position B, so when the excitation signal (leakage) is applied at the position I, the variation of the dynamic pressure with time received by the dynamic pressure transducer at the position M (without considering the energy loss) is shown in FIG. 4. According to the analysis in the figure, the decompression wave signal generated by the leakage at the position I propagates to both the upstream and downstream with the speed a, and the following is an analysis of the pressure wave signal in the present process:

the pressure wave signal propagating to the upstream $\overleftarrow{p}$: the $\overleftarrow{p}$ continues to propagate to the upstream until the upstream boundary, because the material loss caused by the leakage is replenished at the boundary, the pressure density returns to the state before the leak occurred; similarly, the replenishment will also propagate to the downstream because of the continuity of the fluid, i.e. being represented as a boost wave with a magnitude of $\Delta H_1$; the signal is collected by the dynamic pressure transducer M at a moment $t_2$, which is represented as the water head rises by $\Delta H_1$;

the pressure wave signal propagating to the downstream $\overrightarrow{P}$: while the $\overleftarrow{p}$ propagating to the upstream, the $\overrightarrow{P}$ also is propagating to the downstream, and when the $\overrightarrow{P}$ propagating to the unknown leakage hole to be detected at the position B, an existence of the decompression wave reduces the pressure difference between internal and external pressures of the pipeline at the unknown leakage hole to be detected at position B, and decreases an amount of material leakage, and on a basis of the original stability, which is equivalent to the material replenishment is obtained at the position, which in turn leads to an increase in both density and pressure at the position, and generating a boost wave signal $P_B$; then, the $\overrightarrow{P}$ continues to propagate to the downstream and reaches the downstream boundary, and completes the same change as $\overleftarrow{p}$, the material loss is replenished, resulting in a boost wave propagating to the upstream and being collected by the dynamic pressure transducer M at the moment $t_4$, which is represented as the water head rises by $(\Delta H_1 - \Delta H_2)$. This value is obtained by considering the influence of the newly generated pressure wave at the leakage hole, which will be analyzed in detail below.

$\overrightarrow{P_B}$: when the $\overrightarrow{P}$ reaching the leakage point B, a new pressure wave signal propagating to both the upstream and downstream will be generated, the new pressure wave signal propagating to the downstream $\overrightarrow{P_B}$ will be superimposed with the original signal $\overrightarrow{P}$, and a final result will be a decrease in the value of the signal $\overrightarrow{P}$, the superimposed signal propagates to the downstream boundary, where the material is replenished and a boost wave is sent back to the upstream, which is detected by the dynamic pressure transducer at the moment $t_4$, being represented as the water head rises by $(\Delta H_1 - \Delta H_2)$;

$\overleftarrow{P_B}$: the new pressure wave signal propagating to the upstream $\overleftarrow{P_B}$, propagates to the position M at the moment $t_1$, which is detected by the dynamic pressure transducer and represented as the water head rises by $\Delta H_2$, and the signal continues to propagates to the upstream until reaching the upstream boundary, the boost wave due to "material replenishment" will disappear due to the loss of excess material, i.e. the boost wave disappears. Since a pressure rise has been generated on a trajectory of the boost wave, due to the continuity of the fluid, the phenomenon that the boost wave disappears will propagate to the downstream, which is represented as the decompression wave detected by the dynamic pressure transducer Mat the moment $t_4$, and is represented as the water head drops by $\Delta H_2$.

Further, the signal processing module uses the signal processing technology of wavelet transform to identify singular points of the transient pressure. The reflected pressure wave generated at the leakage point is affected by pipeline vibration, background transient and instrument noise, and contains a lot of noise; moreover, due to the continuous attenuation of pressure wave signal, the reflected signal of leakage will be confused and difficult to identify. Therefore, a key point of leak detection is to extract effective features of the leakage signal and accurately identify the reflected pressure wave signal for accurate leak detection and positioning. Because the wavelet transform has good time-frequency characteristics, the present embodiment applies the wavelet transform to de-noise and identify the pressure wave signals, extract, analyze and compare effective features, so as to achieve the purpose of leak detection and positioning. At the same time, adopting the short-time Fourier transform, the signal will be transformed into the frequency domain, and because the frequency characteristic of the signal is the inherent characteristic of the signal itself, the frequency signal at the leakage hole is obviously different from the frequency signal in the pipeline, thus the analysis of frequency band of the leakage signal can help identify the leakage information and improve the accuracy of the detection method.

A method of leak detection for oil and gas pipeline based on excitation response, comprising the following steps:

(1) applying an excitation signal: applying an active excitation signal (a pressure pulse directly input by human) or a passive excitation signal (a pressure fluctuation caused by opening and closing valves, etc.) to the oil and gas pipeline with existing leakage points, and a pressure waves generated by the excitation signal propagates to both ends of the pipeline respectively;

(2) collecting signals: a transient pressure signal is collected by a dynamic pressure transducer mounted along the pipeline, and a pressure wave signal collected by the dynamic pressure transducer is finally transmitted to a monitoring host through a dynamic data capture card (an A/D capture card);

(3) processing signals: because a collected transient pressure signal contains noise, de-noising the collected dynamic pressure signal by wavelet transform, then extracting the effective features, identifying signal singularity, judging and identifying the reflected pressure wave signal combined with the frequency domain features, analyzing and comparing, so as to achieve the purpose of leakage detection and positioning;

(4) analyzing the transient pressure response: analyzing and comparing variations of the transient pressure response with time when there is no leakage and leakage in the pipeline, finding out the difference of the transient pressure response under the two working conditions, identifying the reflected signals generated by the leakage signal and the excitation signal propagating to the leakage hole and storage tanks at upstream and downstream, then judging whether there is leakage or not;

(5) judging leakage and positioning: analyzing an arrival time of the reflected pressure wave and amplitude frequency characteristics of the pressure wave, and judging the leakage of the pipeline according to a performance of the pressure wave in the time domain combined with a distribution in the frequency domain, and carrying out an accurate positioning of the leakage point according to the time when the reflected pressure wave reaches the dynamic pressure transducer and a propagation speed of pressure wave in the pipe.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

Although the specific embodiments of the invention are described above in combination with the accompanying drawings, it is not a limitation on the protection scope of the invention. Those skilled in the art should understand that on the basis of the technical scheme of the invention, various modifications or deformations that can be made by those skilled in the art without creative labor are still within the protection scope of the invention.

What is claimed is:

1. A system of leak detection for oil and gas pipeline based on an excitation response, comprising:
   an excitation signal module, being configured to generate an excitation signal to be transmitted to an oil and gas pipeline to be detected;
   a detection module, comprising a plurality of dynamic pressure transducers arranged along the oil and gas pipeline, for detecting, during the propagation of a pressure wave generated by the excitation signal, a reflected signal formed by that a transient signal of the pressure wave is deflected when reaching a pipeline boundary and/or a leakage point, wherein, a waveform of the reflected signal is a reflected pressure wave;
   a transient pressure response module, being configured to compare variations of transient pressure responses when there is no leakage in the pipeline and there is leakage in the pipeline, to find out differences of the transient pressure responses under the two operating conditions, and to determine whether there is a leak;
   a signal processing module, being configured to de-noise a collected dynamic pressure signal, extract effective features, identify signal singularities, and carry out a judgment combined with frequency domain features to identify the reflected pressure wave signal, and analyze an arrival time of the reflected pressure wave and amplitude and frequency characteristics of the pressure wave, determine the leakage of the pipeline according to performance of the pressure wave in the time domain combined with a distribution in the frequency domain, and carry out an accurate positioning of the leakage point according to the arrival time of the reflected pressure wave at the dynamic pressure transducers and a propagation speed of the pressure wave in the pipeline.

2. The system of leak detection for oil and gas pipeline based on an excitation response as claimed in claim 1, wherein: the excitation signal comprises an active excitation signal and a passive excitation signal.

3. The system of leak detection for oil and gas pipeline based on an excitation response as claimed in claim 1, wherein: an upstream and a downstream of the oil and gas pipeline are provided with one storage tank respectively.

4. The system of leak detection for oil and gas pipeline based on an excitation response as claimed in claim 1, wherein: the detection module comprises at least one dynamic pressure transducer arranged at the upstream of the oil and gas pipeline and connected with an A/D capture card being connected with a processor.

5. A method of leak detection for oil and gas pipeline based on excitation response, comprising:
generating an excitation signal to be transmitted to an oil and gas pipeline to be detected;
detecting in real time a reflected signal formed by a transient signal of a pressure wave being turned when it reaches a pipeline boundary and/or a leakage point by using a dynamic pressure transducer, during a propagation of the pressure wave generated by the excitation signal;
de-noising a collected dynamic pressure signal and extracting effective features to identify signal singularities, and carrying out a judgment combined with frequency domain features to identify a reflected pressure wave signal;
comparing variations of transient pressure responses of the pipeline without a leak and with a leak with time, finding out differences of the transient pressure responses under the two operating conditions, and judging whether there is a leak or not;
analyzing an arrival time of the reflected pressure wave signal and amplitude and frequency characteristics of the pressure wave, judging the leakage of the pipeline according to performance of the pressure wave in a time domain combined with a distribution in a frequency domain, and carrying out an accurate positioning of the leakage point according to the arrival time of the reflected pressure wave at the dynamic pressure transducers and a propagation speed of the pressure wave in the pipeline.

6. The method of leak detection for oil and gas pipeline based on excitation response as claimed in claim 5, wherein: the collected dynamic pressure signal is de-noised by a wavelet transform.

7. The method of leak detection for oil and gas pipeline based on excitation response as claimed in claim 5, wherein: the reflected pressure wave signal is transformed into a frequency domain by using short-time Fourier transform; because the frequency characteristics of the signal are the inherent characteristics of the signal itself, a frequency signal at the leakage hole is different from the frequency signal inside the pipeline, and identifying the leakage information can be helped by an analysis of frequency band of the leakage signal.

8. The method of leak detection for oil and gas pipeline based on excitation response as claimed in claim 5, wherein: the variation of transient pressure response with time with the excitation signal applied under an operating condition without unknown leak hole is: boundaries of an upstream and a downstream of the pipeline system are storage tanks, so when the excitation signal is applied at a position I, the leak at the position I generates a decompression wave signal propagating to both sides of the upstream and downstream with a speed a, and characteristics of the pressure wave signal are as follows:
a pressure wave signal propagating to the upstream $\overleftarrow{p}$ the pressure wave $\overleftarrow{p}$ propagates to the upstream and reaches the dynamic pressure transducer at the position M at a moment $t_0$, the dynamic pressure transducer at the position M detects the signal, and which is represented as a water head drops by $\Delta H_1$; the $\overleftarrow{p}$ continues to propagate to the upstream until the upstream boundary, because a material loss caused by the leakage is replenished at the boundary, the pressure density returns to the state before the leak occurred; similarly, the replenishment will also propagate to the downstream because of the continuity of the fluid, i.e. being represented as a boost wave with a magnitude of $\Delta H_1$, the signal is collected by the dynamic pressure transducer at the position M at a moment $t_2$, which is represented as the water head rises by $\Delta H_1$;
a pressure wave signal propagating to the downstream $\overrightarrow{p}$ : while the $\overleftarrow{p}$ propagating to the upstream, the $\overrightarrow{p}$ also is propagating to the downstream until it reaches the downstream boundary, with the completion of the same change of the $\overrightarrow{p}$, the material loss is replenished, generating a boost wave propagating to the upstream, which is collected by the dynamic pressure transducer at the position M, and represented as the water head rises by $\Delta H_1$.

9. The method of leak detection for oil and gas pipeline based on excitation response as claimed in claim 5, wherein: the variation of transient pressure response with time with the applied excitation signal applied under an operating condition with unknown leakage hole is:
the upstream and downstream boundaries of the pipeline system are the storage tanks, there is an unknown leakage hole point to be detected at a position B, so when the excitation signal is applied at the position I, the variation of the dynamic pressure with time is received by the dynamic pressure transducer at the position M, the decompression wave signal generated by the leakage at the position I propagates to both the upstream and downstream with the speed a, and characteristics of the pressure wave signal during the process are as follows:
the pressure wave signal propagating to the upstream $\overleftarrow{p}$ : the pressure wave $\overleftarrow{p}$ continues to propagate to the upstream until the upstream boundary, because the material loss caused by the leakage is replenished at the boundary, the pressure density returns to the state before the leak occurred; similarly, the replenishment will also propagate to the downstream because of the continuity of the fluid, i.e. being represented as a boost wave with a magnitude of $\Delta H_1$;
the pressure wave signal propagating to the downstream $\overrightarrow{P}$: while the $\overleftarrow{p}$ propagating to the upstream, the $\overrightarrow{P}$ also is propagating to the downstream, and when the $\overrightarrow{P}$ propagating to the unknown leak hole to be detected at the position B, an existence of the decompression wave reduces the pressure difference between internal and external pressures of the pipeline at the unknown leak hole to be detected at position B, and decreases an amount of material leakage, and on a basis of the original stability, the material replenishment is obtained at the position, which in turn leads to an increase in both density and pressure at the position, and generating a boost wave signal $P_B$; then, the $\overrightarrow{P}$ continues to propagate to the downstream and reaches the downstream boundary, and completes the same change as $\overrightarrow{p}$, the material loss is replenished, resulting in a boost wave propagating to the upstream with a magnitude of $\Delta H_2$, which is represented as the water head rises by $(\Delta H_1 - \Delta H_2)$.

10. The method of leak detection for oil and gas pipeline based on excitation response as claimed in claim 9, wherein:

when the $\vec{P}$ reaching the unknown leak hole to be detected at the position B, a new pressure wave signal propagating to both the upstream and downstream $P_B$ will be generated, a new pressure wave signal propagating to the downstream $\vec{P_B}$ will be superimposed with original the signal $\vec{P}$, and a final result will be a decrease in the value of the signal $\vec{P}$, the superimposed signal propagates to the downstream boundary, where the material is replenished and a boost wave with the magnitude of $\Delta H_2$ is sent back to the upstream, which is detected by the dynamic pressure transducer at the position M, being represented as the water head rises by $(\Delta H_1 - \Delta H_2)$.

11. The method of leak detection for oil and gas pipeline based on excitation response as claimed in claim 9, wherein: a new pressure wave signal propagating to the upstream $\overline{P_B}$ propagates to the dynamic pressure transducer at the position M at the moment $t_1$ and is detected by the dynamic pressure transducer at the position M and represented as the water head rises by $\Delta H_2$, and the signal continues to propagates to the upstream until reaching the upstream boundary, the boost wave due to "material replenishment" will disappear due to the loss of excess material, i.e. the boost wave disappears, since a pressure rise has been generated on a trajectory of the boost wave, due to the continuity of the fluid, the phenomenon that the boost wave disappears will propagate to the downstream, which is represented as the decompression wave detected by the dynamic pressure transducer at the position M and is represented as the water head drops by $\Delta H_2$.

* * * * *